Dec. 15, 1970    I. G. SUNDSTRÖM    3,548,296
METHOD AND APPARATUS FOR CONTROLLING THE PHASE ANGLE
AND AMPLITUDE OF A PERIODIC SIGNAL BY USING
TWO PHASES OF A REFERENCE SIGNAL
Filed Sept. 19, 1967

INVENTOR
INGVAR GEORG SUNDSTRÖM
BY Hane and Bayley
ATTORNEYS

United States Patent Office 3,548,296
Patented Dec. 15, 1970

3,548,296
METHOD AND APPARATUS FOR CONTROLLING THE PHASE ANGLE AND AMPLITUDE OF A PERIODIC SIGNAL BY USING TWO PHASES OF A REFERENCE SIGNAL
Ingvar Georg Sundström, Molndal, Sweden, assignor to Telefonaktiebolaget L M Ericsson, Stockholm, Sweden, a corporation
Filed Sept. 19, 1967, Ser. No. 668,893
Claims priority, application Sweden, Oct. 13, 1966, 13,882/66
Int. Cl. G05f 1/68
U.S. Cl. 323—102
2 Claims

ABSTRACT OF THE DISCLOSURE

The amplitude and phase of a periodic signal is adjusted by forming the difference between the adjusted periodic signal and a periodic reference signal and thereafter generating a first phase difference signal representing the difference in the phases of the reference signal and the difference signal and generating a second phase difference signal representing the phase difference between the reference signal, shifted 90° in phase, and the difference signal. Both of the phase difference signals are integrated to provide control signals for adjusting the amplitude and phase of the periodic signal.

---

This invention refers to a method of setting the phase angle and the amplitude of a periodic signal in a determined relation with the phase and the amplitude of a reference signal of the same frequency, and to an arrangement for carrying out this method.

In order to lock the amplitude and the phase angle of a periodic signal there was previously used different types of arrangements containing filters and amplifiers which are very sensitive to distortion and to variations in the frequency of the signal.

The present invention has for an object the provision of a method by means of which a signal can have a very exactly determined phase angle and amplitude value in relation to another alternating voltage of the same frequency independently of distortion and frequency within a great frequency range, and an arrangement for carrying out this method. The method according to the invention is mainly characterized by the fact that a difference signal is formed between a set signal and the reference signal. The difference signal is compared with the reference signal and also with a 90° phase shifted reference signal in order to obtain signals which are proportional to the phase differences. These phase difference signals are integrated and the integrated signals are utilized to produce the amplitude- and the phase angle setting, respectively, of the periodic signal.

The arrangement for practicing the method is characterized by containing an amplitude regulator and a phase angle regulator for the setting of the periodic signal and also an adding circuit forming a difference signal between the set periodic signal and the reference signal. The arrangement includes two phase detectors one of which forms a phase difference signal proportional to the phase difference between the difference signal and the reference signal and the other forms a phase difference signal proportional to the phase difference between the difference signal and 90° phase shifted reference signal. The arrangement furthermore includes firstly an integrator that integrates the output signal of the one phase detector and supplies the integrated value in the form of a control signal to the amplitude regulator, and secondly an integrator that integrates the signal obtained from the output of the other phase detector and supplies the integrated value in the form of a control signal to the phase angle regulator.

Figure 1:
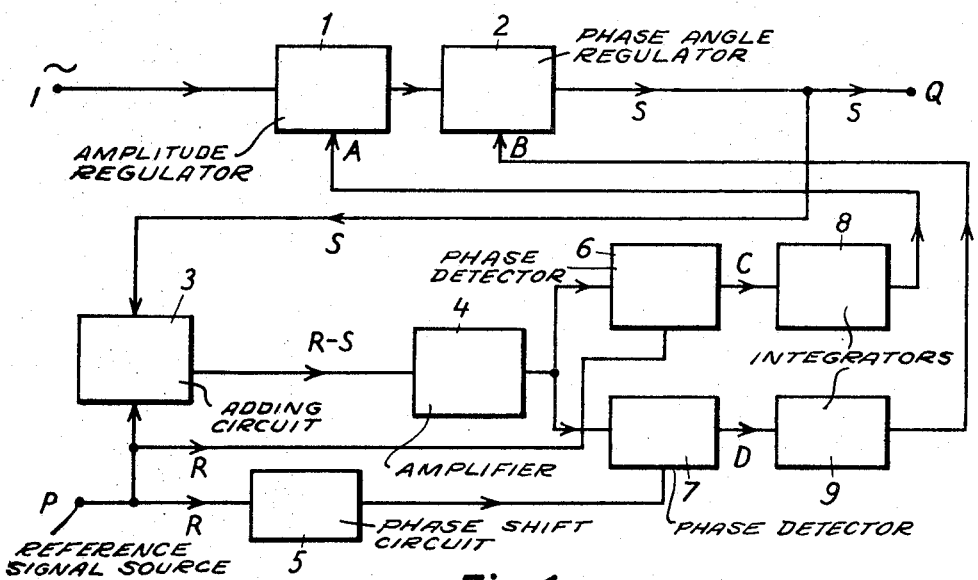
Figure 2:
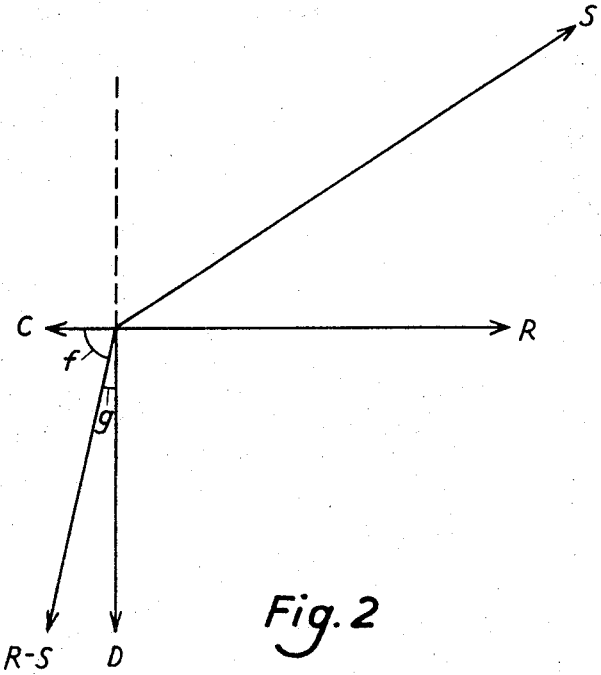

The invention will be described in more detail with reference to the accompanying drawing in which FIG. 1 shows a block diagram of the arrangement according to the invention and FIG. 2 is a vector diagram explaining the principle of the invention.

In FIG. 1 the arrangement is shown comprising an amplitude regulator 1 of for example the transistor-amplifier type, and a phase angle regulator 2. The phase-angle regulator includes a series-connected resistance and a capacitance wherein the phase angle of a signal supplied through the junction of the resistance and of the capacitor will be varied due to the fact that the regulating signal affects the value of the resistance. The amplitude regulator 1 and the phase angle regulator 2 are connected in series. According to the example the signal which is to be set is supplied from point I to the input of the amplitude regulator 1 and the regulated signal S is obtained at the point Q connected to the output of the phase angle regulator 2. A difference circuit 3 obtains the output signal from the point Q and furthermore the periodic reference signal R from the point P and produces a difference signal R–S which is supplied to an amplifier 4. The signal from the amplifier 4 is supplied firstly to a phase detector 6 where it is compared with the reference signal R and secondly to a phase detector 7 which receives via a phase shift circuit 5 the 90° phase shifter reference signal for comparison with the output signal from the amplifier 4. On the output of the phase detector 6 as well as on the output of the phase detector 7 a rectified voltage signal is obtained, which is proportional to the cosine of the phase difference between the signals being compared, the phase difference being determined by the phase detectors. The output of the phase detector 6 is connected to an integrator 8 whose output signal is utilized as a control signal for the amplitude regulator 1. In a corresponding way the output signal from an integrator 9 input is connected to the output of the phase detector 7 is used to control the phase angle regulator 2.

The fundamental function of the arrangement appears from the vector diagram in FIG. 2. The regulated signal obtained at the point Q, when the regulating process, is starting for the sake of simplicity is presupposed to be identical with the signal supplied to the input I of the arrangement. By R is indicated the reference signal and by R–S the signal obtained from the adding circuit 3 and which after amplification is supplied to the phase detectors 6 and 7. The phase detector 6 gives an output signal C which is proportional to the cosine of the fixed phase difference $f°$ between the difference signal R–S and the reference signal R as has been described above. The phase detector 7 gives an output signal D which is proportional to the cosine of the fixed phase difference 90–$f$-$g$ between the difference signal R–S and the 90° phase shifted reference signal R. The signal C is integrated in the integrator 8 and the signal D is integrated in the integrator 9, the integrated signal from the first mentioned integrator being supplied to the amplitude regulator 1 and the integrated signal from the last-mentioned integrator being supplied to the phase angle regulator 2. When the value of the difference vector R–S is different from O, the integrated values of the direct voltages C and D will always be increasing or decreasing dependent on whether the direct voltages are positive or negative. The decrease and the increase respectively of the integrated voltages will regulate the amplitude and the phase angle respectively in such a way that when the control signal is increasing, the amplitude and the phase angle respectively of the regulated signal will increase and when the control signal is decreasing, they will decrease. From FIG. 2 it is seen that the regulation ceases as soon as the vectors R and S coincide. As soon as the least deviation arises, the vectors C and D attempt to restore the zero difference condition between the signals R and S. The system consequently approaches a stable balance position.

The invention is of course not limited to the example described but various modifications are possible. For example one can control the signal dealt with, in such a way that its amplitude and/or its phase angle has an arbitrarily predetermined relation to the amplitude and the phase angle respectively of the reference signal.

I claim:

1. The method of controlling the amplitude and phase angle of a periodic signal to have predetermined values with respect to the amplitude and phase angle of a periodic reference signal having the same frequency, comprising the steps of generating a difference signal representing the difference between the reference signal and the controlled periodic signal, generating a first phase difference signal representing the difference between the phases of the controlled periodic signal and the periodic reference signal, generating a second phase difference signal representing the difference between the phase of the controlled periodic signal and the periodic reference signal shifted in phase by ninety electrical degrees, integrating each of the first and second phase difference signals to form first and second integrated signals, respectively, controlling the amplitude of the periodic signal in accordance with the amplitude of the first integrated signal and controlling the phase of the periodic signal in accordance with the amplitude of the second integrated signal.

2. Arrangement for adjusting the phase angle and the amplitude of a periodic signal comprising an input for receiving the periodic signal and an output for transmitting the adjusted periodic signal and a phase angle regulator connected in series between said input and said output, each of said regulators having a control input, a reference signal source, a difference circuit having one input connected to said output and another input connected to said reference signal source for forming a difference signal between the adjusted periodic signal and the reference signal, a 90° phase shifting circuit having an input connected to said reference signal source and an output, a first phase detector having one input connected to the output of said difference circuit and other input connected to said reference signal source so as to form a first phase difference signal proportional to the phase difference between said difference signal and the reference signal, a second phase detector having one input connected to said difference signal and another input connected to the output of said phase shifting circuit so as to form a second phase difference signal proportional to the phase difference between the difference signal and the reference signal shifted by ninety electrical degrees, a first integrator having an input connected to the output of said first phase detector and an output connected to the control input of said amplitude regulator so as to supply the integrated value in the form of a control signal to said amplitude regulator, and a second integrator having an input connected to the output of said second phase detector and an output connected to a control input of said phase angle regulator so as to supply the integrated value in the form of a control signal to said phase angle regulator.

References Cited
UNITED STATES PATENTS

| | | | |
|---|---|---|---|
| 3,305,767 | 2/1967 | Beihl et al. | 323—22T |
| 3,373,330 | 3/1968 | O'Brien | 323—20UX |
| 3,398,354 | 8/1968 | Budd, Jr. | 323—106X |
| 3,436,647 | 4/1969 | Gobeli et al. | 328—155X |

J D MILLER, Primary Examiner

G. GOLDBERG, Assistant Examiner

U.S. Cl. X.R.

307—262, 264; 323—106, 108; 328—155